(12) United States Patent
Miller et al.

(10) Patent No.: US 8,364,678 B2
(45) Date of Patent: *Jan. 29, 2013

(54) HOUSEHOLD LEVEL SEGMENTATION METHOD AND SYSTEM

(75) Inventors: David R. Miller, Annandale, VA (US); Kenneth L. Inman, Poway, CA (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 598 days.

This patent is subject to a terminal disclaimer.

(21) Appl. No.: 12/202,805

(22) Filed: Sep. 2, 2008

(65) Prior Publication Data

US 2008/0319834 A1    Dec. 25, 2008

Related U.S. Application Data

(63) Continuation of application No. 09/872,457, filed on Jun. 1, 2001, now Pat. No. 7,428,526.

(60) Provisional application No. 60/294,319, filed on May 29, 2001.

(51) Int. Cl.
*G06F 17/30* (2006.01)

(52) U.S. Cl. ........................ 707/737; 707/713

(58) Field of Classification Search ............... 707/736, 707/741, 750, 999.003, 999.005, 690, 740, 707/217, 713, 737; 704/9; 715/231; 725/35; 709/217; 705/10, 38, 4, 2, 7.34, 30
See application file for complete search history.

(56) References Cited

U.S. PATENT DOCUMENTS

| | | |
|---|---|---|
| 5,201,010 A | 4/1993 | Deaton et al. |
| 5,227,874 A | 7/1993 | Von Kohorn |
| 5,504,675 A | 4/1996 | Cragun et al. |
| 5,612,527 A | 3/1997 | Ovadia |
| 5,630,127 A | 5/1997 | Moore et al. |
| 5,687,322 A | 11/1997 | Deaton et al. |
| 5,774,868 A | 6/1998 | Cragun et al. |
| 5,806,032 A | 9/1998 | Sproat |
| 5,848,396 A | 12/1998 | Gerace |
| 5,873,068 A | 2/1999 | Beaumont et al. |
| 5,948,061 A | 9/1999 | Merriman et al. |
| 5,991,735 A | 11/1999 | Gerace |
| 6,029,139 A | 2/2000 | Cunningham et al. |
| 6,070,147 A | 5/2000 | Harms et al. |
| 6,202,053 B1 * | 3/2001 | Christiansen et al. .......... 705/38 |
| 6,298,330 B1 | 10/2001 | Gardenswartz et al. |
| 6,430,539 B1 | 8/2002 | Lazarus et al. |
| 6,490,567 B1 | 12/2002 | Gregory |
| 6,662,215 B1 * | 12/2003 | Moskowitz et al. .......... 709/217 |
| 6,742,003 B2 * | 5/2004 | Heckerman et al. .......... 398/189 |
| 6,748,426 B1 | 6/2004 | Shaffer et al. |

(Continued)

FOREIGN PATENT DOCUMENTS

EP          822535          4/1998

OTHER PUBLICATIONS

Advisory Action for U.S. Appl. No. 09/872,457, mailed Aug. 3, 2007, 2 pages.

(Continued)

*Primary Examiner* — Jean M Corrielus
(74) *Attorney, Agent, or Firm* — Hanley, Flight & Zimmerman, LLC (57) ABSTRACT

Methods and apparatus for household level segmentation are disclosed. An example method to classify consumers in clusters includes receiving population data indicative of a population of consumers and receiving a plurality of profiles, at least one profile to evaluate partitioning of the population of consumers. The example method also includes selecting at least one of the plurality of profiles based on a count limit value in accordance with a classification tree dimension split.

15 Claims, 6 Drawing Sheets

U.S. PATENT DOCUMENTS

| | | | |
|---|---|---|---|
| 6,836,773 | B2 | 12/2004 | Tamayo et al. |
| 6,839,682 | B1 | 1/2005 | Blume et al. |
| 7,072,841 | B1* | 7/2006 | Pednault ............................ 705/4 |
| 7,089,194 | B1 | 8/2006 | Berstis et al. |
| 7,243,075 | B1 | 7/2007 | Shaffer et al. |
| 7,577,576 | B2* | 8/2009 | Baechtiger ................... 705/7.31 |
| 7,912,734 | B2* | 3/2011 | Kil .................................... 705/2 |
| 8,046,797 | B2* | 10/2011 | Bentolila et al. ................. 725/46 |
| 2002/0083067 | A1 | 6/2002 | Tamayo et al. |
| 2002/0184077 | A1* | 12/2002 | Miller et al. .................... 705/10 |
| 2003/0061132 | A1* | 3/2003 | Yu et al. ........................... 705/30 |
| 2005/0039206 | A1* | 2/2005 | Opdycke ......................... 725/35 |
| 2005/0096971 | A1* | 5/2005 | Baechtiger ...................... 705/11 |
| 2005/0240462 | A1* | 10/2005 | Inman et al. .................... 705/10 |
| 2005/0240468 | A1* | 10/2005 | Inman et al. .................... 705/10 |
| 2008/0319834 | A1* | 12/2008 | Miller et al. .................... 705/10 |

OTHER PUBLICATIONS

Advisory Action for U.S. Appl. No. 09/872,457, mailed Jul. 10, 2007, 3 pages.

Business Wire, "Claritas Announces Second in Its Suite of Internet-Deliverable Products; MyBestCosumters Comes Less Than a Moth After the Launch of MyBest Prospects," Aug. 1, 2000, 3 pages.

Business Wire, "Sagent Partners With claritas to Deliver Real-time Marketing Information for More Effective Customer Analysi," Mar. 29, 2000, 5 pages.

Claritas Understanding Psycholographics, 2006, 4 pages.

Interview Summary for U.S. Appl. No. 09/872,457, mailed Jun. 27, 2008, 2 pages.

Interview Summary for U.S. Appl. No. 10/829,405, mailed Sep. 2, 2008, 2 pages.

Lars Perner "The Psychology of Consumers," 2006, 33 pages.

Ma et al., "On reconstruction Species trees from Gene trees in term of duplication and losses," 1998, 11 pages.

Notice of Allowance and Fees Due for U.S. Appl. No. 09/872,457, mailed May 13, 2008, 4 pages.

Office action for U.S. Appl. No. 09/872,457, mailed Apr. 17, 2007, 6 pages.

Office action for U.S. Appl. No. 09/872,457, mailed Febuary 2, 2006, 3 pages.

Office action for U.S. Appl. No. 09/872,457, mailed Jan. 3, 2007, 17 pages.

Office action for U.S. Appl. No. 09/872,457, mailed Jun. 3, 2005, 10 pages.

Office action for U.S. Appl. No. 09/872,457, mailed Mar. 17, 2006, 9 pages.

Office action for U.S. Appl. No. 09/872,457, mailed Nov. 17, 2005, 10 pages.

Office action for U.S. Appl. No. 09/872,457, mailed Sep. 5, 2006, 11 pages.

Office action for U.S. Appl. No. 10/829,405, mailed Apr. 4, 2008, 8 pages.

Office action for U.S. Appl. No. 10/829,405, mailed Jan. 5, 2009, 12 pages.

Office action for U.S. Appl. No. 11/119,235, mailed Dec. 19, 2008, 9 pages.

Zhang et al., "A prolog system for case based classification," 1990, 1 page.

Zhang et al., "An implementation of ID3 that Creates Executable Rules," 1990, 1 page.

Zhang Heping, "Classification trees for multiple binary responses," 1998, 15 pages.

* cited by examiner

HOUSEHOLD LEVEL SEGMENTATION METHOD AND SYSTEM

CROSS REFERENCE TO RELATED APPLICATIONS

This patent is a continuation of U.S. patent application Ser. No. 09/872,457, filed on Jun. 1, 2001, which is incorporated herein by reference.

BACKGROUND OF THE INVENTION

1. Field of the Invention

The invention relates to method and apparatus for population segmentation. In particular, the invention relates to a method and system of household-level segmentation.

2. Related Art

For marketing purposes, knowledge of customer behavior is important, if not crucial. For direct marketing, for example, it is desirable to focus the marketing on a portion of the segment likely to purchase the marketed product or service.

In this regard, several methods have traditionally been used to divide the customer population into segments. The goal of such segmentation methods is to predict consumer behavior and classify consumers into clusters based on observable characteristics. Factors used to segment the population into clusters include demographic data such as age, marital status, and income and behavioral data such as tendency to purchase a particular product or service.

In dividing the population into segments, it is desired to maximize the homogeneity within a cluster, while maximizing the distinctness across clusters. In this regard, traditional segmentation schema have employed a two-stage process involving targeted optimization and cluster evaluation. These schema can begin either with behavior (behaviorally driven) or with demographics (demographically driven).

Figure 1:
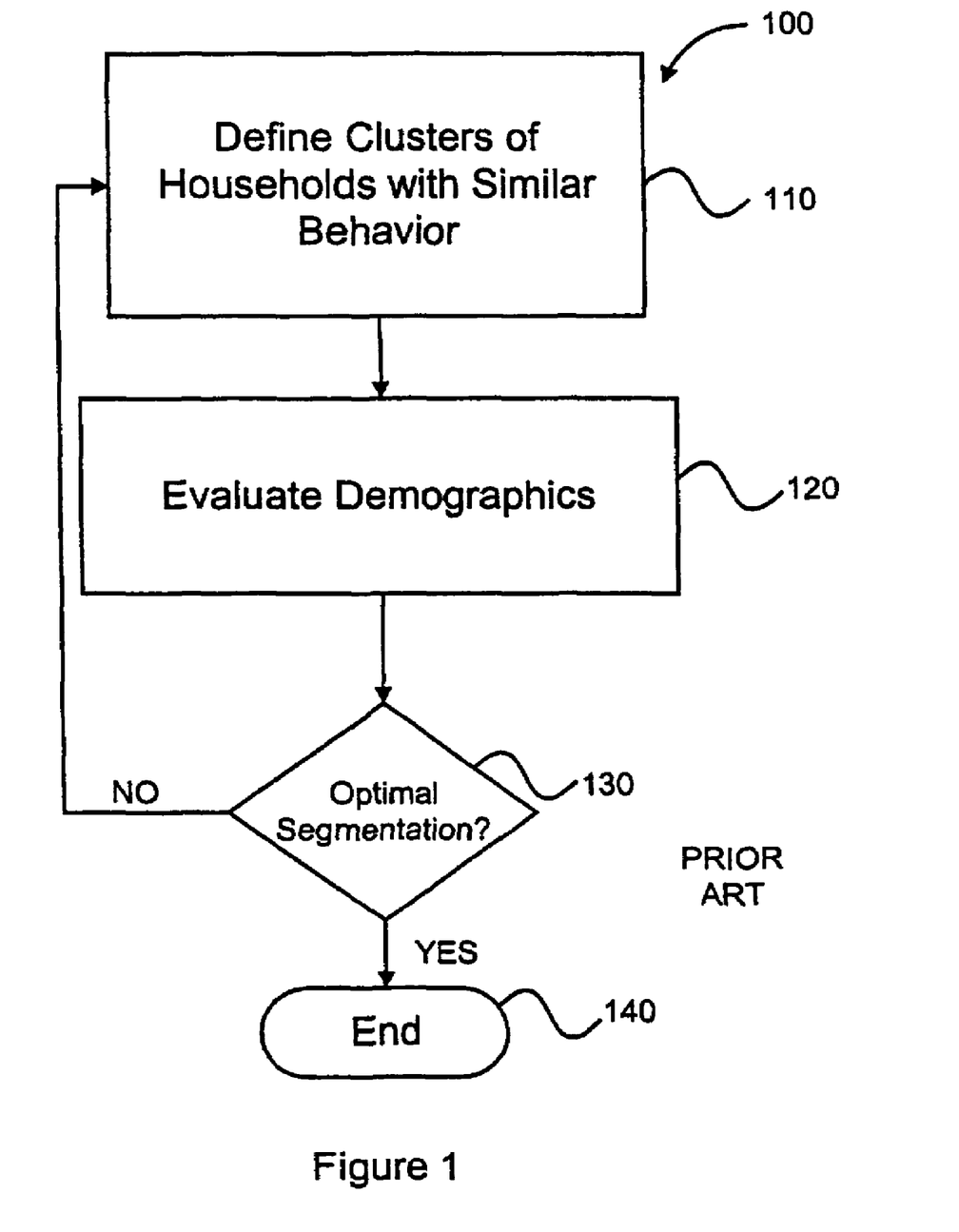
FIG. 1 is a flow chart illustrating a traditional segmentation method.

FIG. 1 illustrates a traditional, behaviorally driven segmentation process 100. At block 110, a set of clusters of households is defined based on common behaviors within each cluster. The clusters are defined such that the behaviors within each cluster are as similar as possible, while being as different as possible across clusters. At block 120, the clusters are evaluated for demographics to determine whether the demographics of each cluster are sufficiently similar within the cluster, while being sufficiently different across the clusters. At block 130, if the demographics do not satisfy the criteria, the process is repeated from block 110 until an optimal segmentation is achieved. Although this iterative method may result in a useful segmentation system, it fails to directly provide a solution that defines clusters based on demographics.

Figure 2:
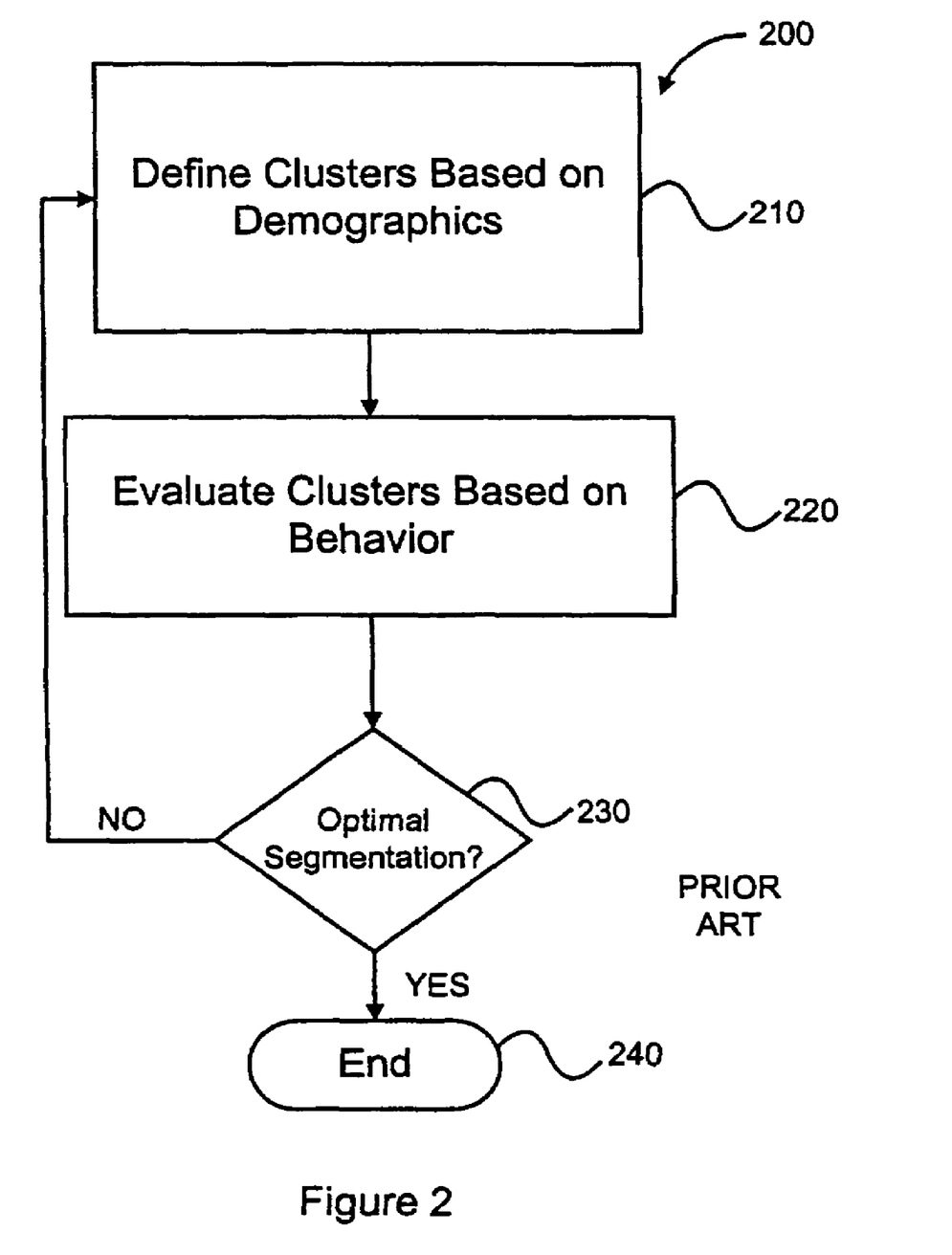
FIG. 2 is a flow chart illustrating another traditional segmentation method.

FIG. 2 illustrates a traditional, demographically driven segmentation process 200. At block 210, a set of clusters of households is defined based on common demographics within each cluster. The clusters are defined such that the demographics within each cluster are as similar as possible, while being as different as possible across clusters. At block 220, the clusters are evaluated for behaviors to determine whether the behaviors of each cluster are sufficiently similar within the cluster, while being sufficiently different across the clusters. At block 230, if the behaviors do not satisfy the criteria, the process is repeated from block 210 until an optimal segmentation is achieved. Similarly to the system described above with reference to FIG. 1, the system of FIG. 2 fails to directly provide a solution that defines clusters based on behavior.

Thus, while these traditional, iterative methods may result in a useful segmentation system, they fail to directly provide a solution that defines clusters based jointly on behavior and demographics.

BRIEF DESCRIPTION OF THE DRAWINGS

In the following, the invention will be explained in further detail with reference to the drawings, in which.

DESCRIPTION OF CERTAIN EMBODIMENTS OF THE INVENTION

The present invention provides a segmentation system for classifying households into market segments that can be used to describe, target and measure consumers by their demand for and use of particular products and services. The segments are optimized to provide high-lift profiles for the evaluation profiles.

One embodiment of the invention provides a method for classifying consumers in clusters comprising generating a plurality of classification trees based on demographic data for a set of consumers and behavioral data for a set of consumers, each of the classification trees producing a consumer cluster set, searching the consumer cluster sets for an optimal consumer cluster set, the optimal consumer cluster set having a plurality of clusters of consumers. Consumers in each cluster of the plurality of clusters have substantially similar behavioral and demographic characteristics to each other and different behavioral or demographic characteristics from consumers in all other clusters of the plurality of clusters.

In a preferred embodiment, consumers in each cluster have different demographic characteristics from consumers in all other clusters of the plurality of clusters.

The segmentation system according to one embodiment of the present invention employs a partitioning program that optimizes a segmentation based on both behavioral and demographic factors. A classification tree methodology is used and all possible combinations of input variables are searched to identify an optimal combination which best predicts a targeted set of consumer behaviors. The classification tree methodology results in a set of terminal nodes.

Figure 3:
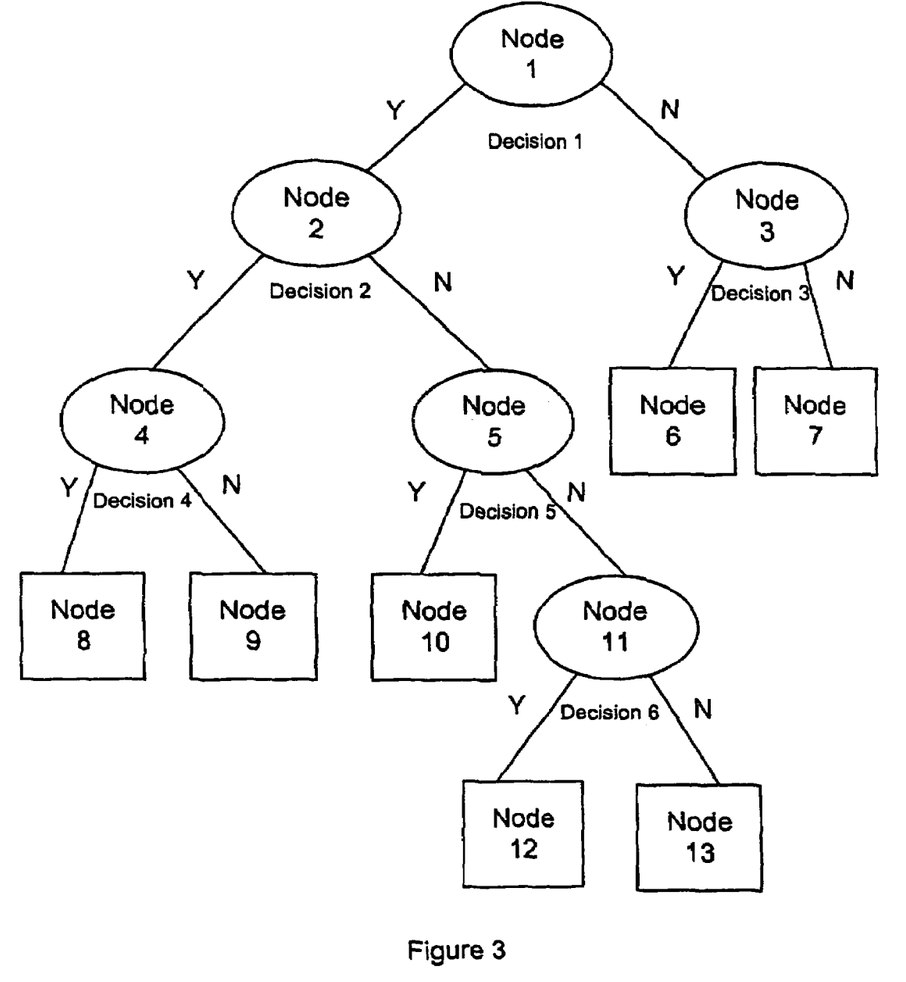
FIG. 3 is an example of a classification tree.
Figure 4:
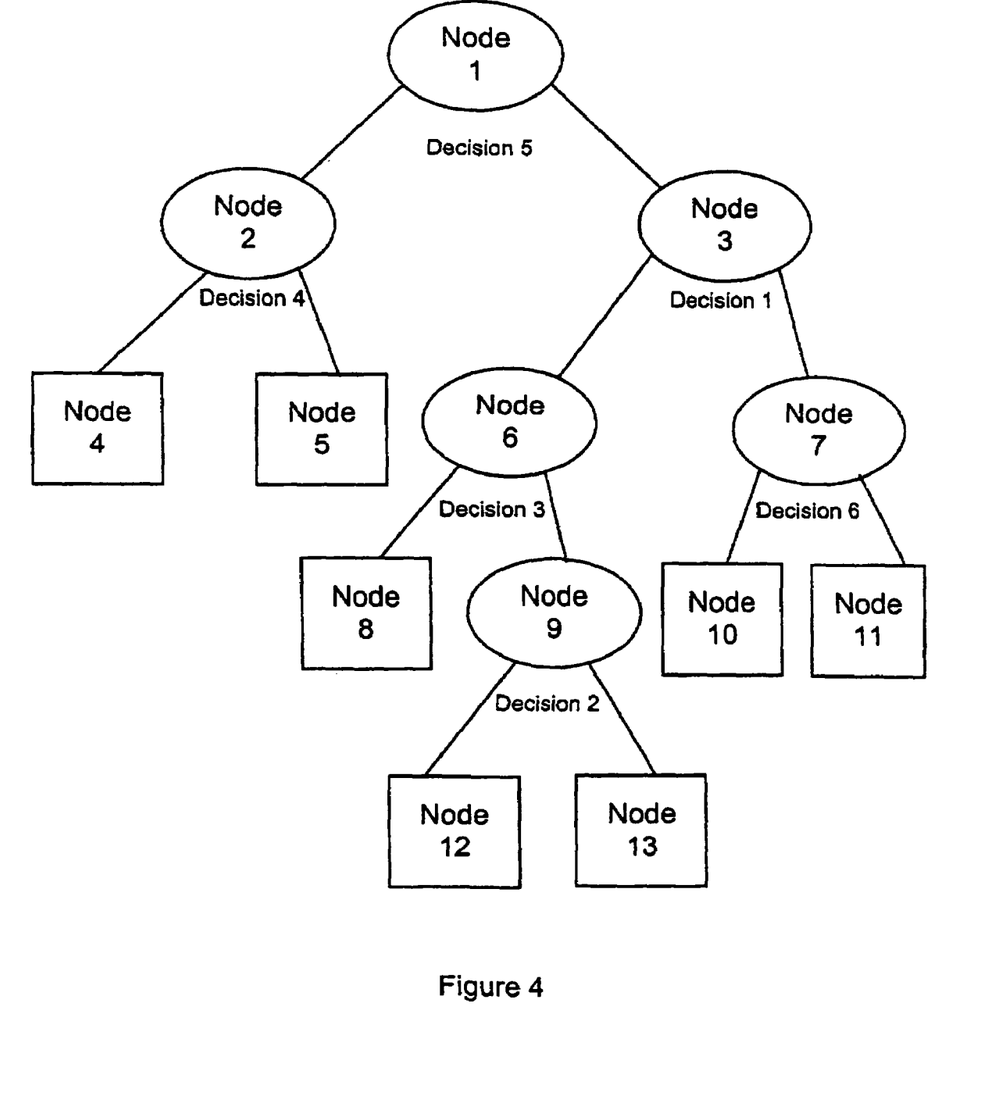
FIG. 4 is another example of a classification tree.

FIGS. 3 and 4 illustrate examples of classification trees. Referring first to FIG. 3, a population at Node 1 is split based on Decision 1 into populations at Node 2 and Node 3. These populations are further split according to additional decisions until terminal nodes (shown in rectangular blocks), Nodes 6, 7, 8, 9, 10, 12 and 13, are reached. The terminal nodes represent clusters determined by the segmentation system.

In FIG. 4, the same population in Node 1 may be split into populations at Node 2 and Node 3 based on a different decision, Decision 5 for example, than used to split Node 1 in FIG. 3. Similarly, further decisions are used to split the populations until terminal nodes, Nodes 4, 5, 8, 10, 11, 12 and 13, are reached. Thus, the partitioning program of the present invention searches all possible classification trees to determine an optimal combination.

For an optimal combination, each terminal node represents a segment that is homogeneous in both behavior and demographics. One example of a classification tree methodology is disclosed in "Classification Trees for Multiple Binary Responses" by Heping Zhang, *Journal of the American Statistical Association*, March 1998, which is hereby incorporated by reference. The classification tree methodology described therein is hereinafter referred to as "Zhang's methodology".

In one embodiment of a segmentation system according to the present invention, the program searches for a combination that optimizes a measure of behavior and demographic data. For example, for all possible splits in the classification tree, the program selects the split that maximizes:

$$LFract_{vds} \times RFract_{vds} \times TFract_s \times \sum_p (LPen_{p(vds)} - RPen_{p(vds)})^2$$

where:
- $LFract_{vds} \equiv LCount_{vds} \div TCount_s$
- $RFract_{vds} \equiv LCount_{vds} \div TCount_s$
- $TFract_s \equiv TCount_s \div$ Total population over all segments (S).
- $LPen_{p(vds)} \equiv$ For a given profile p within a split of segment s, dimension d, by value v, count of Profile in the left $split_{p(vds)} \div$ Count of base in the left $split_{p(vds)}$.
- $RPen_{p(vds)} \equiv$ For a given profile p within a split of segment s, dimension d, by value v, count of Profile in the right $split_{p(vds)} \div$ Count of base in the right $split_{p(vds)}$.
- {S}=The set of segments being evaluated.
- s=A specific element of {S}.
- {D}=The set of dimensions being evaluated.
- d=A specific element of {D}.
- {V}=The set of values being evaluated. The set of values may be nested within the a particular dimension (d) and segment (s).
- v=A specific element (value) of {V}.
- {P}=set of profiles in use.
- p=A specific element of {P}.
- $LCount_{vds}$=For a given split of segment s, dimension d, by value v, the count of "population" in the "left" split.
- $RCount_{vds}$=For a given split of segment s, dimension d, by value v, the count of "population" in the "right" split.
- $TCount_s$=For a given segment s, the count of "population" contained in the segment prior to being split.

This notation may be extended as follows:
- $TPen_{p(s)}$=For a given profile p and segment s, prior to the proposed split on dimension d, by value v, count of Profile in the $segment_{p(s)} \div$ count of base in $segment_{p(s)}$.

$$LeftGini_{p(vds)} \equiv 2 \times LFract_{vds} \times LPen_{p(vds)} \times (1 - LPen_{p(vds)})$$

$$RightGini_{p(vds)} \equiv 2 \times RFract_{vds} \times RPen_{p(vds)} \times (1 - RPen_{p(vds)})$$

$$TopGini_{p(vds)} \equiv 2 \times TPen_{p(vds)} \times (1 - TPen_{p(vds)})$$

$$\Delta Gini_{p(vds)} \equiv TFract_{vds} \times (TopGini_{p(vds)} - RightGini_{p(vds)} - LeftGini_{p(vds)})$$

The split is accordingly chosen to maximize the change in the "Gini" impurity measure:

$$Gini_{p(vds)} \equiv \sum_p \Delta Gini_{p(vds)}$$

Figure 5:
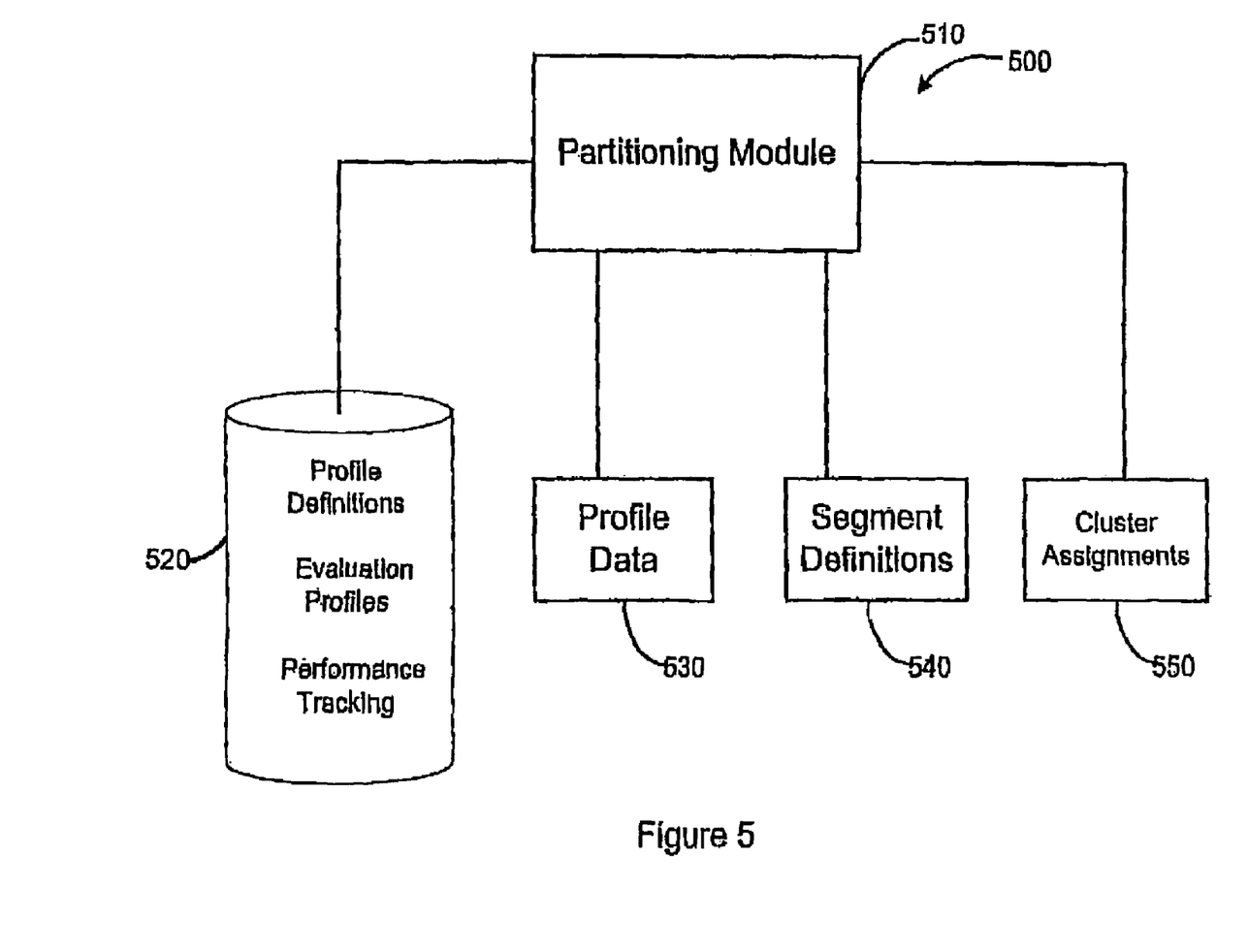
FIG. 5 is a pictorial illustration of a segmentation system according to one embodiment of the invention.

FIG. 5 shows a schematic illustration of a segmentation system 500 according to one embodiment of the invention. The system comprises a primary partitioning module 510. The primary partitioning module 510 defines segments by using a specified set of variables or dimensions. The definition of the segments is dictated by the ability of the segments to create high lift profiles for the evaluation profiles. The primary partitioning module 510 may use a greedy algorithm to sequentially split the data into partitions that at each point create local maxima. The partitioning module 510 may also be used to output the definition of the segments or the assignments themselves. In one embodiment, the primary partitioning module 510 is a program written in Borland Delphi 5.

The partitioning module 510 communicates with a profile definitions module 520, which may be implemented as a database. The profile definitions module 520 may define profiles, their bases and whether they should be used. The profile definitions module 520 may also contain data for defining evaluation profiles, their bases, their classification, and for indicating those which should be used in the evaluation analysis. This data is provided to the partitioning module 510 for optimization of the segmentation. Additional data may be contained in the profile definitions module 520 to keep track of the performance of any models created, the rules for creating the models and compare their performance. In one embodiment, the profile definitions module 520 comprises a Microsoft Access database.

The segmentation system 500 further comprises a profile data module 530. The profile data module 530 contains profile data (summaries of counts). The primary partitioning module 510 uses this data for assessment of the segmentation. In one embodiment, the profile data module 530 is a file comprising records with as many columns as there are profiles.

A segment definitions module 540 is provided in communication with the primary partitioning module 510. The segment definitions module 540 may be implemented as a dBase file containing one record per geocode for providing this data to the primary partitioning module 510. The primary partitioning module 510 uses this data to define the segments. The file may comprise a predetermined number of segmenting variables.

The segmentation system 500 also comprises a cluster assignments module 550. The cluster assignments module 550 may be implemented as a dBase table containing one record per geocode. The cluster assignments module 550 contains the assignments of the clusters which are updated by the primary partitioning program 510 pursuant to optimization based on data received from the profile definitions module 520, the profile data module 530 and the segment definitions module 540.

Thus, the primary partitioning module 510 may execute a program using data from the profile definitions module 520, the profile data module 530 and the segment definitions module 540. The program may perform optimization using classification trees as described above to output optimal cluster assignments to the cluster assignments module 550.

Figure 6:
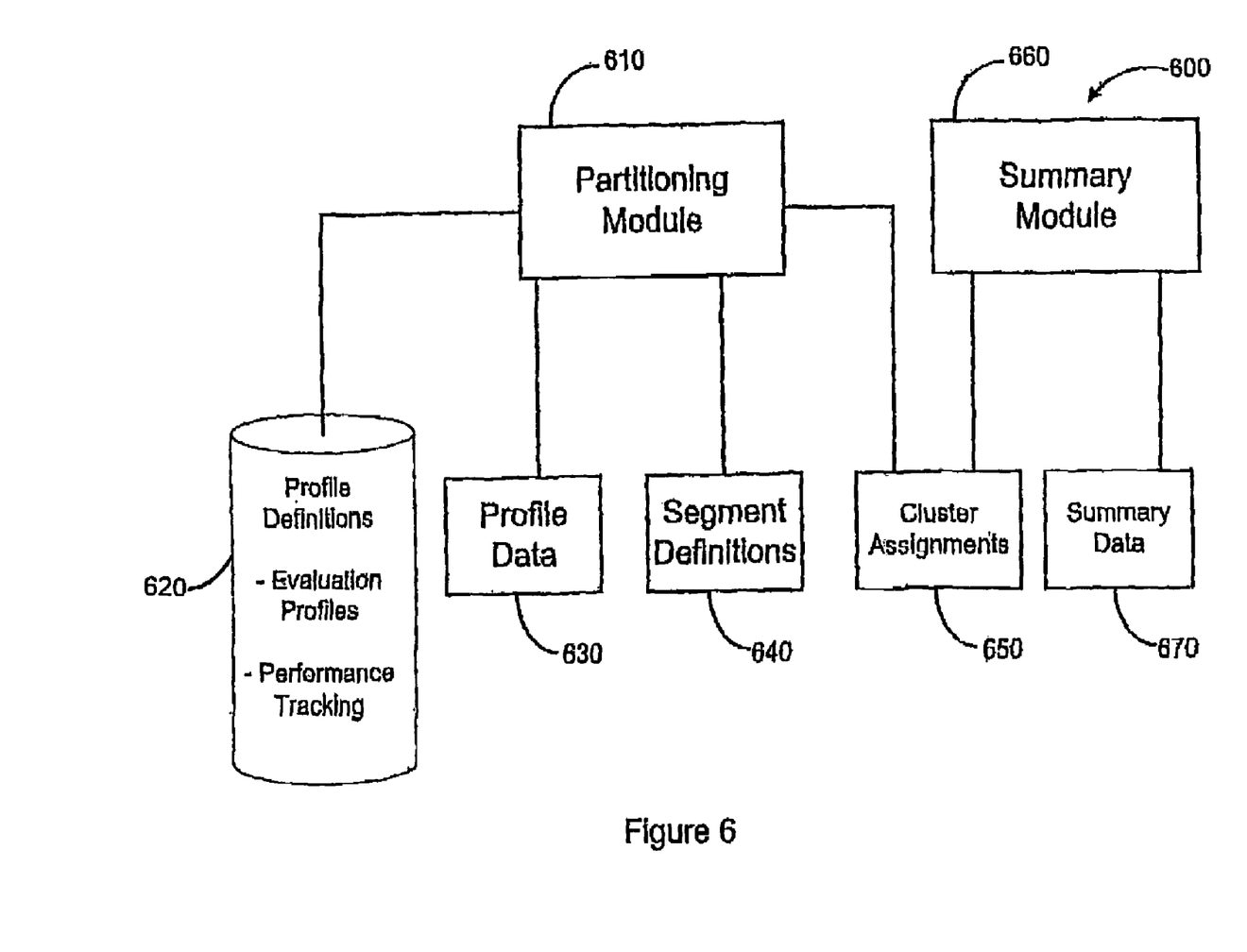
FIG. 6 is a pictorial illustration of a segmentation system according to another embodiment of the invention.

FIG. 6 illustrates a segmentation system 600 according to another embodiment of the invention. Similarly to the segmentation system 500 of FIG. 5, segmentation system 600 of FIG. 6 comprises a partitioning module 610 which uses data from a profile definitions module 620, a profile data module 630 and a segment definitions module 640 to output optimal cluster assignments to a cluster assignments module 650.

The segmentation system 600 further comprises a summary module 660, into which data from the cluster assignments module 650 is input. In one embodiment, the summary module 660 is implemented as a software program written in Borland Delphi 5. The summary module 660 generates model performance statistics and outputs them to a summary data module 670. The summary data module 670 may be implemented as a Microsoft Access database.

In one embodiment, the segmentation system is capable of accommodating up to 250 profiles for evaluating performance, 16,000 records, 20 variable for defining the segments and 80 created segments. With these limits, the system may be implemented on a computer system using Microsoft Windows NT operating system, for example, requiring approximately 45 MB of memory. The summarization module may be implemented on such a system within 5 MB of additional memory and providing up to 100 segments and 999 profiles.

The segmentation systems described above may be used as follows. First, the variables to be used for segmentation are defined in the segment definitions module. A program that can generate dbase tables, such as SPSS, may be used.

Next, the segments are created by the partitioning module. Data may first be loaded into the module by making selections through a menu-type user interface. Program information may be provided in a message window on the display. Data in the profile definitions module controls which profiles are actually used to evaluate the partitioning within the program. A "select" field within the data may be used for this purpose. The program may, by default, load and use only those variables whose "select" value is "0" (used to indicate a base that is always loaded) or "1". The "select" field set to be loaded may be changed using the menu-type user interface. Several sets of profiles may be created. The user can then assess over-specification in the model by comparing the performance between the set of profiles used in the program for assessment and the remaining sets.

After loading the data, the profile section of the display may contain the list of all evaluation profiles that have been loaded. An "InUse" field may indicate whether the profile is currently being used to evaluate the partitioning. Note that profiles that are bases and profiles that have low counts may be turned off. The user can control the low count limit via the user interface. A profile may be manually turned on/off by modifying the "InUse" field.

The executed splits may be listed in a "Split Views" area of the display. This view may show the splits that have been made in the order that they have been applied. The information may show the split number, the dimension that was used in the split, its value (all splits are made as <=value versus > value), and the row (or segment) that was split. Note that in this view, selecting a split sets the "active model" to this point. Information that is characteristic of the model may be presented on the display. Further, on entering the "splits" window, this may be the point from which further segmentation will begin. Thus, for example, selecting split "1-None" effectively resets a model to the beginning. A "performance summary" view may show the performance statistics for the models as well as graphical information. A "dim by value" view may show the dimensions and values used in the splits in summarized form. Fully collapsed, the dimension and number of times it was used may be viewed. A level may be expanded to show the split values and the number of occurrences of that value. Final expansion may show the actual splits.

The tab section may have five sections available. Selecting a "profile and segment statistics" tab may provide either a view of specific profiles or general characteristics of the generated segments. The user may control the profile presented by selecting various profiles from the profile list and control the level of the model displayed from the split views control. A "model performance" tab may show a graph of the model performance in split order. A "split hierarchy display" tab may show the splits in a traditional hierarchical form. A "row dimension data" tab may show input data. Another tab, "Session Model History", may provide information on the models generated in the current session. A model may be stored on this page each time a split is executed at a higher level than the existing model. For example after creating 15 segments, a user may select split 7 and create a new and different split at this stage. The previous 15-cell model will then be stored. From this page, the new "current" model (from the splits table) may be compared to previous models. A previous set of splits may also be restored from this page.

To start splitting the data, a mechanisms may be selected within the "split" window. In one embodiment, three such mechanisms are offered. The user may request the program to suggest a split by click a "Find best split" button. This will cause the program to look for the "best" split currently available. The recommended splits will appear in the proposed "splits list" in order of their relative lift. The recommended split may be executed by clicking a "Make Split" button. The user can select a different split by, for example, double-clicking on the desired alternate split. This action will change the split shown in the first row that is labeled "order 0". As a second option, the user can manually force a split by using dropdown controls. A specific dimension, a specific row (or segment), and a specific value may be selected. Only valid splits may be displayed. The third option is to let the program make a specific number of splits on its own. Enter the number of splits desired into an "iterations" box and click a "Split X Times" button. The program will stop when either the desired number of splits have been made or no further valid splits are available.

Two values may be used to control the valid splits. A minimum segment size may control the minimum population base required. No splits will be created below this threshold. This minimum value may be defined and altered by the user. Further, the program will not make a split more unbalanced than the value indicated in a "min split fraction" box.

The options menu item on the "Splits" form may provide the mechanism to select either "twoing" or "gini" as the measure used to evaluate candidate splits. This menu may also provide the option of using recursion. Recursion should only be used with the "gini" criterion. Recursion, as it sounds, will for each possible split, evaluate all next level possible splits before making a decision on a specific split.

Next, the model may be written out in one of several ways. In one embodiment, there are four options on the file menu that assist in dealing with a model. "Split Vars Used" may display the dimensions available and the number of times splits made with those dimensions. "Show Definition" may create SPSS code, for example, to make the assignments using the current active model and may place text on the message form. "Show limits" may place an obscure definition of the splits in the message form. "Dump assignments" may update data in the cluster assignments module with the assignments from the active model.

Next, the model performance over all available profiles may be summarized via the summarization module. The module may read the segment assignments from the cluster assignments module, match them against binary data in the profile data module, and summarize the profiles. The summarization module may use data from the profile definitions module to define the bases and location of the information. The summarization module may summarize all profiles available in the binary data set. The summarization module may also create the summary data module.

While particular embodiments of the present invention have been disclosed, it is to be understood that various different modifications and combinations are possible and are contemplated within the true spirit and scope of the appended claims. There is no intention, therefore, of limitations to the exact abstract or disclosure herein presented.

What is claimed is:

1. A segmentation system for classifying consumers in clusters, comprising:
    a partitioning module, executed by a processor, to generate a plurality of classification trees, each of the plurality of classification trees including both behavioral and demographic consumer segmenting variables to classify a consumer population, each of the plurality of classification trees further including a plurality of decision nodes and a plurality of terminal nodes, each of the plurality of classification trees to produce a consumer cluster set having a plurality of consumer clusters represented by the terminal nodes, each decision node to indicate a portion of the consumer population and to split the portion of the consumer population into at least two other nodes in accordance with one of the consumer segmenting variables, the partitioning module to search the consumer cluster sets for an optimal consumer cluster set that optimizes a measure of the behavioral and demographic data, and consumers in each consumer cluster of the plurality of consumer clusters in the optimal consumer cluster set having similar behavioral and demographic characteristics to each other and at least one behavioral or demographic characteristic from consumers in other consumer clusters of the plurality of consumer clusters in the optimal consumer cluster set;
    a profile definitions module, executed by the processor, to store profile definitions data to define evaluation profiles to evaluate partitioning of the consumer population, the partitioning module to determine a count for each of the decision nodes of each of the classification trees, at least one of the counts including a right split count, a left split count, and a total count for the corresponding decision node;
    a profile data module, executed by the processor, to store summaries of the counts; and
    a segment definitions module, executed by the processor, to store segment definitions data including variables used to define segments, the partitioning module to compare performance of the classification trees based on the stored profile definitions data, the summaries of the count, and the segment definitions data to determine the classification tree producing the optimal consumer cluster set, the consumer clusters in the optimal consumer cluster set are to focus marketing on groups of consumers.

2. A segmentation system as defined in claim 1, wherein the classification trees are to use Zhang's methodology.

3. A segmentation system as defined in claim 1, wherein the partitioning module is to use a partitioning program.

4. A segmentation system as defined in claim 1, further comprising:
    a summarization module to generate a summarization of data contained in the partitioning module; and
    a summary data module to store the summarization of the data contained in the partitioning module.

5. A segmentation system as defined in claim 1, wherein the profile data module comprises a database to store profile definitions data.

6. A segmentation system as defined in claim 1, wherein the profile data module comprises an electronic file to store the profile data.

7. A segmentation system as defined in claim 1, wherein the segment definitions module comprises a database file to store segment definitions data.

8. A segmentation system as defined in claim 1, further comprising a cluster assignments module to store the plurality of consumer clusters generated by the partitioning module.

9. A segmentation system as defined in claim 8, wherein the cluster assignments module comprises a database table.

10. A method to classify consumers in clusters comprising:
    receiving population data indicative of a population of consumers;
    receiving a plurality of profiles, at least a first one of the profiles to evaluate partitioning of the population of consumers; and
    selecting at least a second one of the plurality of profiles based on a count limit value in accordance with a classification tree dimension split to derive at least one of a node or a terminal node, each terminal node representing a partition of the population of consumers that is homogeneous with respect to both behavior and demographics.

11. A method as defined in claim 10, wherein selecting the at least the second one of the plurality of profiles based on the count limit value further comprises selecting the at least the second one of the plurality of profiles that exceeds the count limit value.

12. A method as defined in claim 10, further comprising removing from consideration at least a third one of the plurality of profiles that includes a count value lower than the count limit.

13. A method as defined in claim 10, further comprising retaining at least one of a plurality of the dimension splits based on a minimum population segment size.

14. A method as defined in claim 10, further comprising retaining at least one of a plurality of the dimension splits based on a split balance value.

15. A method as defined in claim 10, further comprising retaining at least one of a plurality of the dimension splits based on a Gini impurity measure.

* * * * *